(12) United States Patent
Wong (10) Patent No.: US 7,379,474 B1
(45) Date of Patent: May 27, 2008

(54) SYSTEM PARTITIONING TO ALLOW UNIFORM INTERFACING TO PORT MODULES

(75) Inventor: Chi-Yin Wong, Los Gatos, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 963 days.

(21) Appl. No.: 10/213,266

(22) Filed: Aug. 5, 2002

(51) Int. Cl.
*H04J 3/22* (2006.01)

(52) U.S. Cl. ..................................................... 370/466

(58) Field of Classification Search ............. 370/395.1, 370/466, 469, 474
See application file for complete search history.

(56) References Cited

U.S. PATENT DOCUMENTS

| | | | | |
|---|---|---|---|---|
| 5,568,477 | A * | 10/1996 | Galand et al. | 370/229 |
| 5,878,045 | A * | 3/1999 | Timbs | 370/466 |
| 6,009,108 | A * | 12/1999 | Takehara et al. | 370/538 |
| 6,111,880 | A * | 8/2000 | Rusu et al. | 370/395.53 |
| 6,751,224 | B1 * | 6/2004 | Parruck et al. | 370/395.6 |
| 6,982,991 | B1 * | 1/2006 | Atoji | 370/474 |
| 7,215,671 | B1 * | 5/2007 | Karasawa | 370/395.1 |
| 7,289,510 | B2 * | 10/2007 | Matsumura | 370/395.1 |
| 2002/0031141 | A1 * | 3/2002 | McWilliams | 370/463 |
| 2002/0044555 | A1 * | 4/2002 | Kamo et al. | 370/395.1 |
| 2004/0202179 | A1 * | 10/2004 | Tan et al. | 370/395.1 |
| 2004/0213248 | A1 * | 10/2004 | Okuda et al. | 370/466 |
| 2007/0019674 | A1 * | 1/2007 | Bourlas et al. | 370/466 |

\* cited by examiner

*Primary Examiner*—Anh-Vu H. Ly
(74) *Attorney, Agent, or Firm*—Townsend and Townsend and Crew (57) ABSTRACT

A method for converting data for a interface module and a network data plane is provided. The data is converted using an interface in a telecommunications system. The method includes receiving data in a plurality of data formats through the interface module. The plurality of data formats include a variable format of a variable-length and a fixed format of a fixed-length. The data in the plurality of data formats is then converted into a predetermined network data plane format and sent in the network data plane format to the network data plane. The method further includes receiving data in the predetermined network data plane format from the network data plane. Then, a format in the plurality of data formats to convert the data received from the network data plane to is determined and the data in the network data plane data format is converted to the determined data format. The data in the determined data format is sent to the interface module.

38 Claims, 9 Drawing Sheets

Table 3-1 VSC7216 Ingress Cell Format (ATM)

| Word | Bits 31:0 | | | |
|---|---|---|---|---|
| | [31:24] | [23:16] | [15:8] | [7:0] |
| 0 | S. K28.1 | Reserved (0's) | RCA Header | Header 1 |
| 1 | Header 2 | Header 3 | Header 4 | Header 5 |
| 2 | Payload 1 | Payload 2 | Payload 3 | Payload 4 |
| 3 | Payload 5 | Payload 6 | Payload 7 | Payload 8 |
| ... | ... | ... | ... | ... |
| 12 | Payload 41 | Payload 42 | Payload 43 | Payload 44 |
| 13 | Payload 45 | Payload 46 | Payload 47 | Payload 48 |
| 14 | Odd Parity | Odd Parity | Odd Parity | Odd Parity |
| 15 | 0x00 | 0x00 | MIC Backpressure Word | |
| 16 (where required) | MIC Configuration word OR K28.5 idle word | | | |

FIGURE 6

Table 3-2 VSC7216 Ingress Cell Format (POS)

| Word | Bits 31:0 | | | |
|---|---|---|---|---|
| | [31:24] | [23:16] | [15:8] | [7:0] |
| 0 | S. K28.1 | Reserved (0's) | RCA Header | Reserved |
| 1 | Byte 1 | Byte 2 | Byte 3 | Byte 4 |
| 2 | Byte 5 | Byte 6 | Byte 7 | Byte 8 |
| 3 | Byte 9 | Byte 10 | Byte 11 | Byte 12 |
| ... | ... | ... | ... | ... |
| 12 | Byte 45 | Byte 46 | Byte 47 | Byte 48 |
| 13 | Byte 49 | Byte 50 | Byte 51 | Byte 52 |
| 14 | Odd Parity | Odd Parity | Odd Parity | Odd Parity |
| 15 | 0x00 | 0x00 | MIC Backpressure word | |
| 16 (where required) | MIC Configuration word OR K28.5 idle word | | | |

FIGURE 7

Table 3-3 VSC7216 Egress Cell Format

| Word | Bits 31:0 | | | |
|---|---|---|---|---|
| | [31:24] | [23:16] | [15:8] | [7:0] |
| 0 | S. K28.1 | Reserved (0's) | RCA Header | Header 1 |
| 1 | Header 2 | Header 3 | Header 4 | Header 5 |
| 2 | Payload 1 | Payload 2 | Payload 3 | Payload 4 |
| 3 | Payload 5 | Payload 6 | Payload 7 | Payload 8 |
| ... | ... | ... | ... | ... |
| 12 | Payload 41 | Payload 42 | Payload 43 | Payload 44 |
| 13 | Payload 45 | Payload 46 | Payload 47 | Payload 48 |
| 14 | Odd Parity | Odd Parity | Odd Parity | Odd Parity |
| 15 | S. K28.5 | S. K28.5 | S. K28.5 | S. K28.5 |
| 16 (where required) | S. K28.5 | S. K28.5 | S. K28.5 | S. K28.5 |

FIGURE 8

Table 3-4 First Packet cell with length field

| Word | Bits 31:0 | | | |
| --- | --- | --- | --- | --- |
| | [31:24] | [23:16] | [15:8] | [7:0] |
| 0 | S. K28.1 | Reserved (0's) | RCA_Header | Header 1 |
| 1 | Header 2 | Header 3 | Header 4 | Header 5 |
| 2 | Packet Length (MSB) | Packet Length (LSB) | Byte 1 | Byte 2 |
| 3 | Byte 3 | Byte 4 | Byte 5 | Byte 6 |
| ... | ... | ... | ... | ... |
| 12 | Byte 42 | Byte 43 | Byte 45 | Byte 46 |
| 13 | Byte 47 | Byte 48 | Byte 49 | Byte 50 |
| 14 | Odd Parity | Odd Parity | Odd Parity | Odd Parity |
| 15 | S. K28.5 | S. K28.5 | S. K28.5 | S. K28.5 |
| 16 (where required) | S. K28.5 | S. K28.5 | S. K28.5 | S. K28.5 |

FIGURE 9

SYSTEM PARTITIONING TO ALLOW UNIFORM INTERFACING TO PORT MODULES

BACKGROUND OF THE INVENTION

The present invention relates generally to telecommunication systems and more specifically to a system and method for converting and transferring data in a telecommunications system.

The amount of data communicated through networks, such as the Internet, is increasing dramatically. To meet the increased demand for network bandwidth, different data formats have been developed to communicate data through networks. Examples of different formats include Synchronous Optical Network (SONET)/Synchronous Digital Hierarchy (SDH), DS3/E3, Ethernet, Gigabit Ethernet, and the like.

Information is transmitted through the network in frames of data, which may also be referred to as packets or cells of data. One difference among the various formats is the general size of a transmitted frame of data and the speed in which the frame of data is transmitted. Also, the different formats may transmit frames of data in a variable-length or fixed-length format.

A telecommunications device, such as an aggregator, is used to aggregate data transmitted in the different formats. Because each of the different formats requires a different port type to connect telecommunications devices to the network, the telecommunications device requires a different port type for each format received at the telecommunications device.

To address the problem of receiving and transmitting data that require different ports, industry standard interfaces, such as Utopia/Packet over Sonet II (POSII) and Utopia/Packet over Sonet III (POSIII), have been developed to standardize interfaces for telecommunications devices. A telecommunications device may then use the standard interface to receive data for processing in the telecommunications device's processor.

Typically, the telecommunications device includes a port interface module that extracts data and provides the traffic directly to the network processor through the industry standard interface. The port interface module extracts the data in the format the data was received. Thus, if the data received is in a variable-length format, the data is extracted in the variable-length format and directly sent to the processor in the variable-length format. If the data was in a fixed-length format, the data is extracted in the fixed-length format and directly sent to the processor in the fixed-length format. Because data is sent directly to the network processor from the port interface module, the network processor must determine the format the data is in and process the data accordingly. Thus, the network processor uses time and computing power to analyze the data's format.

BRIEF SUMMARY OF THE INVENTION

In one embodiment of the present invention, a method for converting data for a port interface module and a network data plane is provided. The data is converted using an interface in a telecommunications system. The method includes receiving data in a plurality of data formats through the port interface module. In one embodiment, the plurality of data formats includes a variable format of a variable-length and a fixed format of a fixed-length. The data in the plurality of data formats is then converted into a predetermined network data plane format and sent in the network data plane format to the network data plane.

The method further includes receiving data in the predetermined network data plane format from the network data plane. Then, a conversion format from the plurality of data formats is determined and the data in the network data plane data format is converted to the determined data format. The data in the determined data format is sent to the port interface module.

A further understanding of the nature and advantages of the invention herein may be realized by referring to the remaining portions in the specifications and the attached drawings.

DETAILED DESCRIPTION OF THE INVENTION

Figure 1:
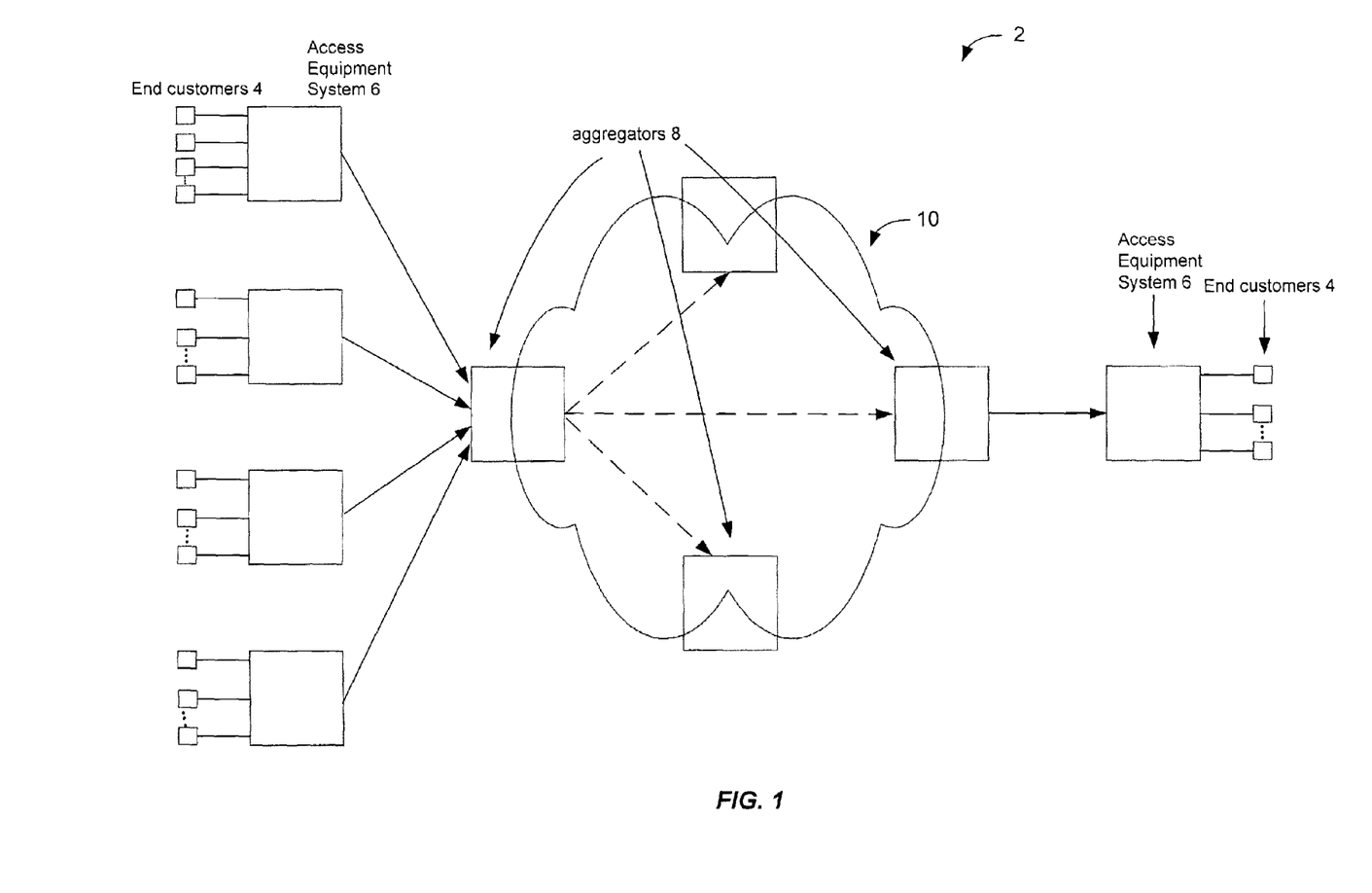
FIG. 1 depicts a simplified block diagram of a telecommunications system according to one embodiment of the present invention.

FIG. 1 depicts a simplified block diagram of a telecommunications system 2 according to one embodiment of the present invention. Telecommunications system 2 includes end customer devices 4, access equipment 6, aggregators 8, and a network 10.

End customer devices 4 are computing devices, such as personal computers (PCs), workstations, personal digital assistants (PDAs), cellular phones, personal PCs, and the like, that communicate data. The data communications are transmitted to access equipment system 6 through communication lines.

Access equipment systems 6 aggregate and multiplex the data received from end customer devices 4. Examples of access equipment systems 6 include digital subscriber line access multiplexer (DSLAM), multiplexers, etc. Data received at access equipment systems 6 are then sent to aggregators 8. Data from a single access equipment system 6 are typically sent in a specific data format and a specific data rate. For example, the data formats include SONET/SDH (OC3, OC12, OC48, etc.), DS3/E3, Ethernet, Gigabit Ethernet, etc. Data in these formats are also transferred at various data rates, where a fixed data rate is associated with a format.

Aggregator 10 receives the data from access equipment systems 6 in the different formats. Aggregator 10 processes the data in the different formats and may send the data to one or more other aggregators 10. Data may be sent in different formats than the received data format. Data are then sent to access equipment system 6 and to another end customer 4 through network 12. Network 12 may be any network, such as the Internet.

Figure 2:
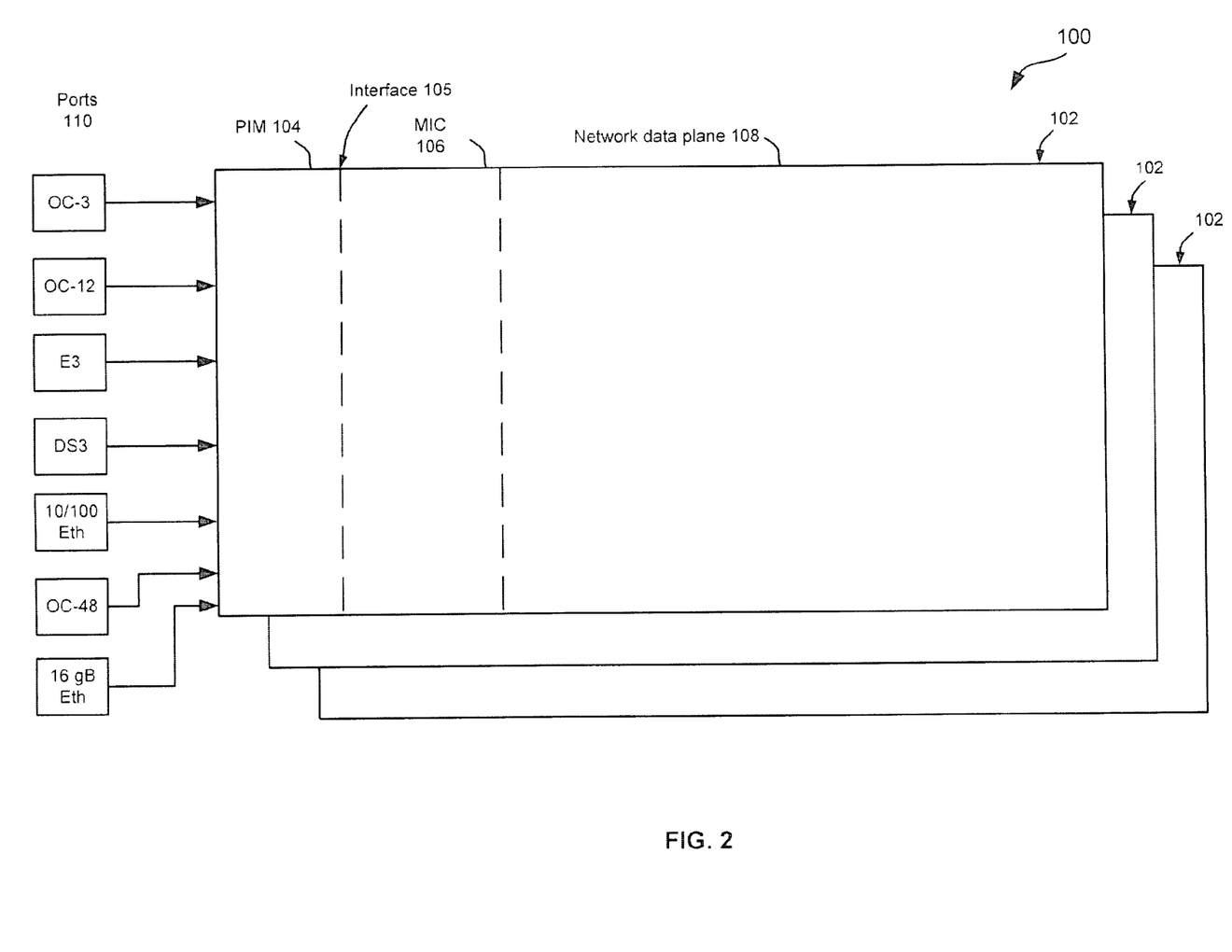
FIG. 2 depicts a simplified block diagram of a network communication system according to one embodiment of the present invention.

FIG. 2 depicts simplified block diagram of a network communication system 100 according to one embodiment of the present invention. In one embodiment, network communication system 100 is included in an aggregator 10. A plurality of network communication modules 102 are provided to receive data communications from a variety of ports 110. Each network communication module 102 includes a port interface module (PIM) 104, a module interface carrier (MIC) 106, and a network data plane 108.

Each network communications module 102 may receive data or a single network communications module 102 may receive data and then communicate the data to the other network communications modules 102. In one embodiment, data refers to data communicated in data packets, data cells, or data frames. These terms may be used interchangeably herein. In one embodiment, data is communicated between network communication modules 102 through a backplane.

PIM 104 provides a physical termination of a port. The ports are illustrated as ports 110, where ports 110 are ports for data being transferred in different formats. PIM 104 receives data in different formats from ports 110. For example, ports 110 may include ports that receive data in the formats of SONET/SDH (OC3, OC12, OC48, etc.), DS3/E3, Ethernet, Gigabit Ethernet, etc.

PIM 104 is configured to extract data from ports 110. In one exemplary embodiment, PIM 104 may include two PIMs where each PIM includes eight ports. Thus, in this embodiment, sixteen ports 110 may be supported.

An interface 105 is provided in between PIM 104 and MIC 106. In one embodiment, interface 105 is a uniform industry standard interface, such as a Utopia/POSII or Utopia/POSIII interface. Interface 105 provides a standard interface to facilitate data communications between PIM 104 and MIC 106.

MIC 106 is configured to receive the extracted data from PIM 104 through interface 105. MIC 106 receives data from different ports 110 and converts the data to a predetermined network data plane format readable by network data plane 108. After converting the data into the network data plane format, MIC 106 then schedules the data communications for network data plane 108. In one embodiment, the network data plane format is a predetermined format of a fixed-length. In a specific embodiment, the network data plane format is a cell of data that includes sixteen or seventeen 32-bits words of data. Embodiments of the network data plane format will be described in more detail below. MIC 106 provides a system partitioning that handles a plurality of ports and data formats with an industry standard interface that simplifies the implementation of port interface module 104 and reduces product cost due to availability of highly integrated devices from multiple vendors.

Network data plane 108 is a processor/switching unit configured to receive data from MIC 106 (ingress direction). Additionally, network data plane 108 is configured to send data to MIC 106 (egress direction). In one embodiment, network data plane 108 is configured to process data in the network data plane format. Thus, instead of having to determine whether data is in a fixed-length or variable-length format, network data plane 108 may assume that the data is in the network data plane format.

As mentioned above, data are processed by MIC 106 in both the ingress and egress directions. In the ingress direction, the data format received from PIM 104 varies among the different ports 110. For example, the data format may be a fixed-length format, such as ATM over SONET/SDH and DS3/E3, or a variable-length format, such as POS and Ethernet. MIC 106 receives data in the fixed and variable length formats and converts the data into the network data plane format readable by the network data plane 108.

In the egress direction, MIC 106 receives data from network data plane 108 in the network data plane format. MIC 106 then determines a port 110 in which the data should be sent. The data are then converted to a data format for the determined port 110 and sent to the determined port 110 through PIM 104. For example, MIC 106 may convert the data from network data plane 108 into a variable or fixed length format depending on the determined port type of a destination port 110.

Figure 3:
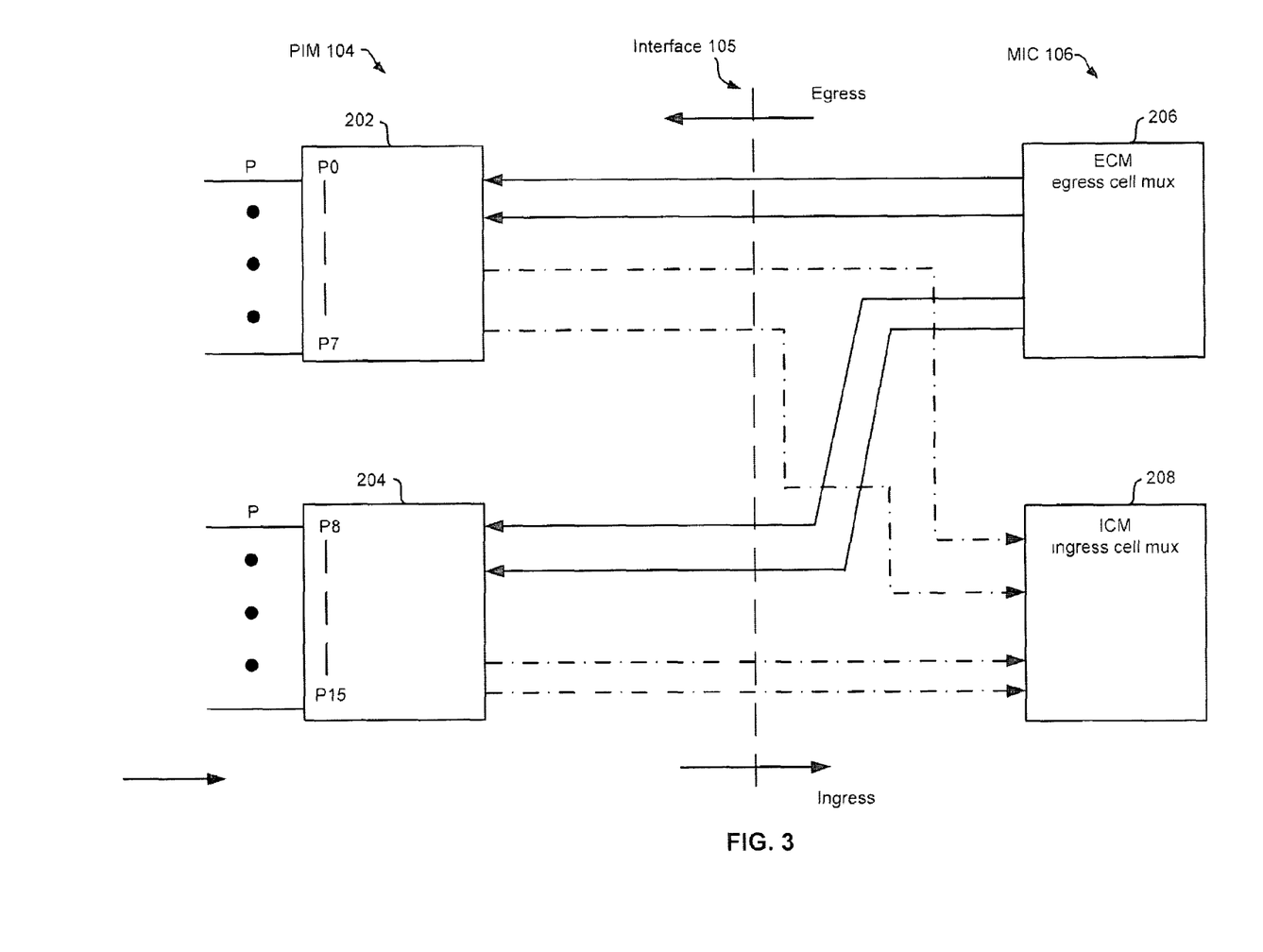
FIG. 3 illustrates a simplified block diagram of port interface module and module interface carrier according to one embodiment of the present invention.

FIG. 3 illustrates a simplified block diagram of PIM 104 and MIC 106 according to one embodiment of the present invention. As shown, PIM 104 includes a PIM 202 and a PIM 204. Although two PIMs 202 and 204 are shown in PIM 104, it will be understood that PIMs 202 and 204 may be combined into a single module and that any number of PIMs may be used. A PIM includes any number of ports of varying port types. In one embodiment, each PIM includes eight ports of varying port types. Each port in the PIM may correspond to a port of ports 110. For example, a port P0 of PIM 202 may be configured to receive data communications from a DS3/E3 port. Additionally, a port P8 in PIM 204 may be configured to receive Ethernet data communications from an Ethernet port. 1331 In one embodiment, PIM 202 and PIM 204 both receive ingress and egress data communications. However, it will be understood that PIM 202 or PIM 204 may be configured to receive just ingress data communications or just egress data communications.

As shown, MIC 106 includes an egress cell MUX (ECM) 206 and an ingress cell MUX (ICM) 208. Although ECM 206 and ICM 208 are shown, it will be understood that ECM 206 and ICM 208 may be combined into a single module or MIC 106 may include additional ECMs 206 or ICMs 208.

ECM 206 is configured to receive egress data from network data plane 108. ECM 206 then converts the data, which are in the network data plane format, to a data format compatible with a corresponding port of PIM 104. Thus, ECM 206 determines an appropriate port of PIM 104 to which the converted data should be sent. ECM 206 then sends the converted data to the port of the port type of PIM 104. For example, if the data received in the network data plane format should be sent to port P8 of PIM 204, which is configured for Ethernet data communications, ECM 206 converts the data into the variable-length format required for the Ethernet format and sends the data to port P8.

ICM 208 is configured to receive ingress data from PIM 104. ICM 208 converts the data, which may be in one of the different formats of ports 110, into the network data plane format and sends the converted data to network data plane 108 for processing. For example, ICM 208 may receive data from port P0 of PIM 202. ICM 208 determines that port P0 is configured for ATM traffic over DS3 of a fixed-length format and converts the data into the network data plane format. The data in the network data plane format is then sent to network data plane 108.

The method of sending ingress data through network communications module 102 will now be described. As mentioned above, MIC 106 receives ingress data from PIM 104 where the data may be in multiple formats, such as a fixed-length and variable-length format. MIC 106 then converts the fixed-length and variable-length data into the network data plane format.

Figure 4:
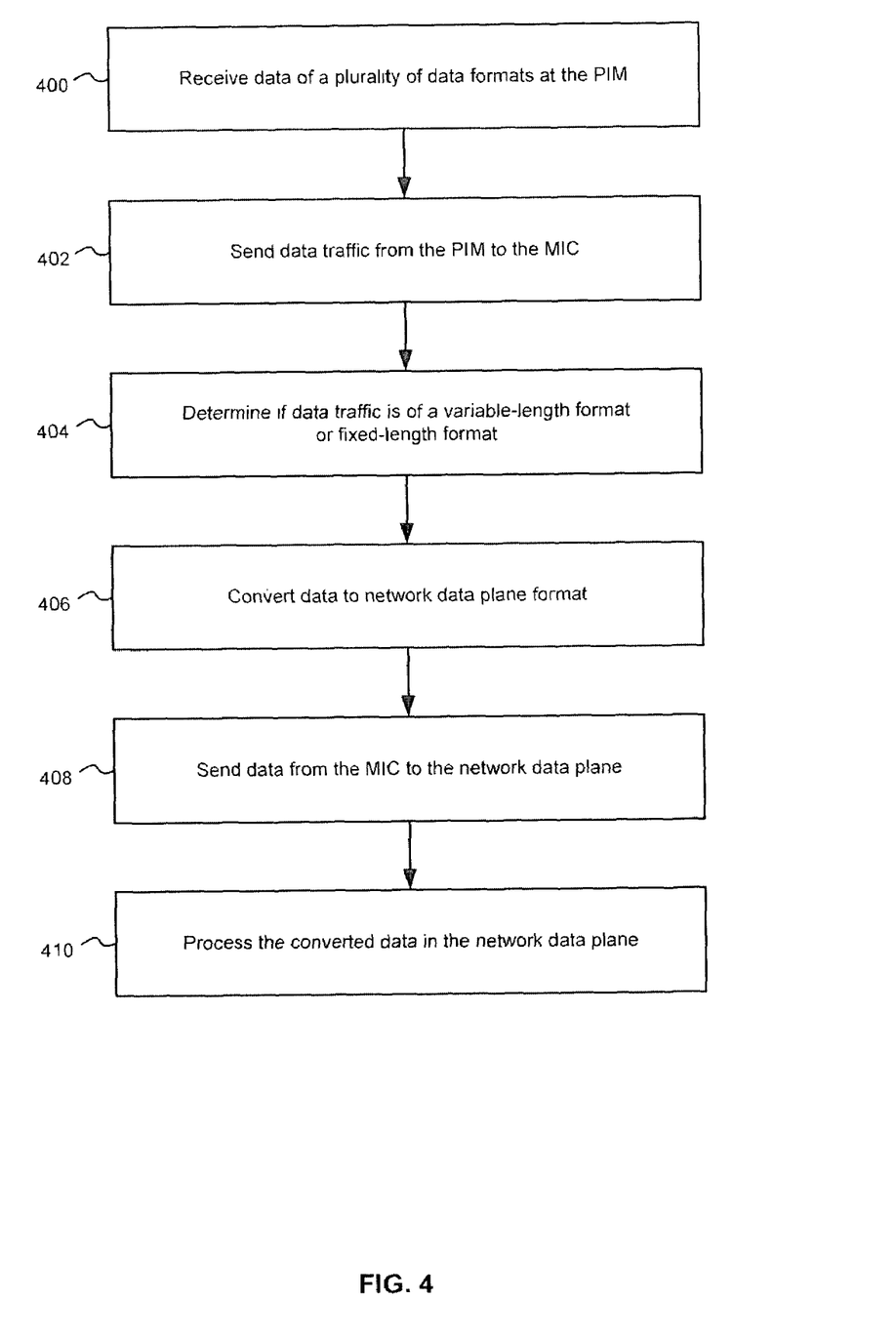
FIG. 4 illustrates a simplified flowchart of a method for converting and transferring data communications in the ingress direction according to one embodiment of the present invention.

FIG. 4 illustrates a simplified flowchart for converting and transferring data in the ingress direction according to one embodiment of the present invention. In step 400, data having one of a plurality of data formats is received from ports 110 at PIM 104. As described above, a plurality of data formats may be of a fixed-length or variable-length format.

In step 402, the data are sent from PIM 104 to MIC 106 through interface 105. In one embodiment, the data are sent from PIM 204 to ICM 208.

In step 404, after receiving the data, MIC 106 determines if the data received is of a variable-length or fixed-length format. In determining the format of the MIC 106 determines a source port from which the data was received. Because ports are associated with different formats, MIC 106 can determine the format associated with the port and thus determine whether the data is of a variable-length or fixed-length format.

In step 406, MIC 106 converts the data to a predetermined network data plane format. As mentioned above, the predetermined network data plane format is a predetermined format of a fixed-length that network data plane 108 can use without determining whether the data communications received at MIC 106 is of a fixed-length or variable-length format. In one embodiment, the fixed-length network data plane format is a cell of data including sixteen or seventeen 32-bit words in one embodiment.

In step 408, the data that is being converted into the network data plane format is sent to network data plane 108. In an exemplary embodiment, the cell of data is sent in 32-bit words. In one embodiment, the data from the ports in PIM 104 are multiplexed into one stream before being sent to network data plane 108.

In step 410, network data plane 108 processes the converted data in the network data plane format.

Figure 5:
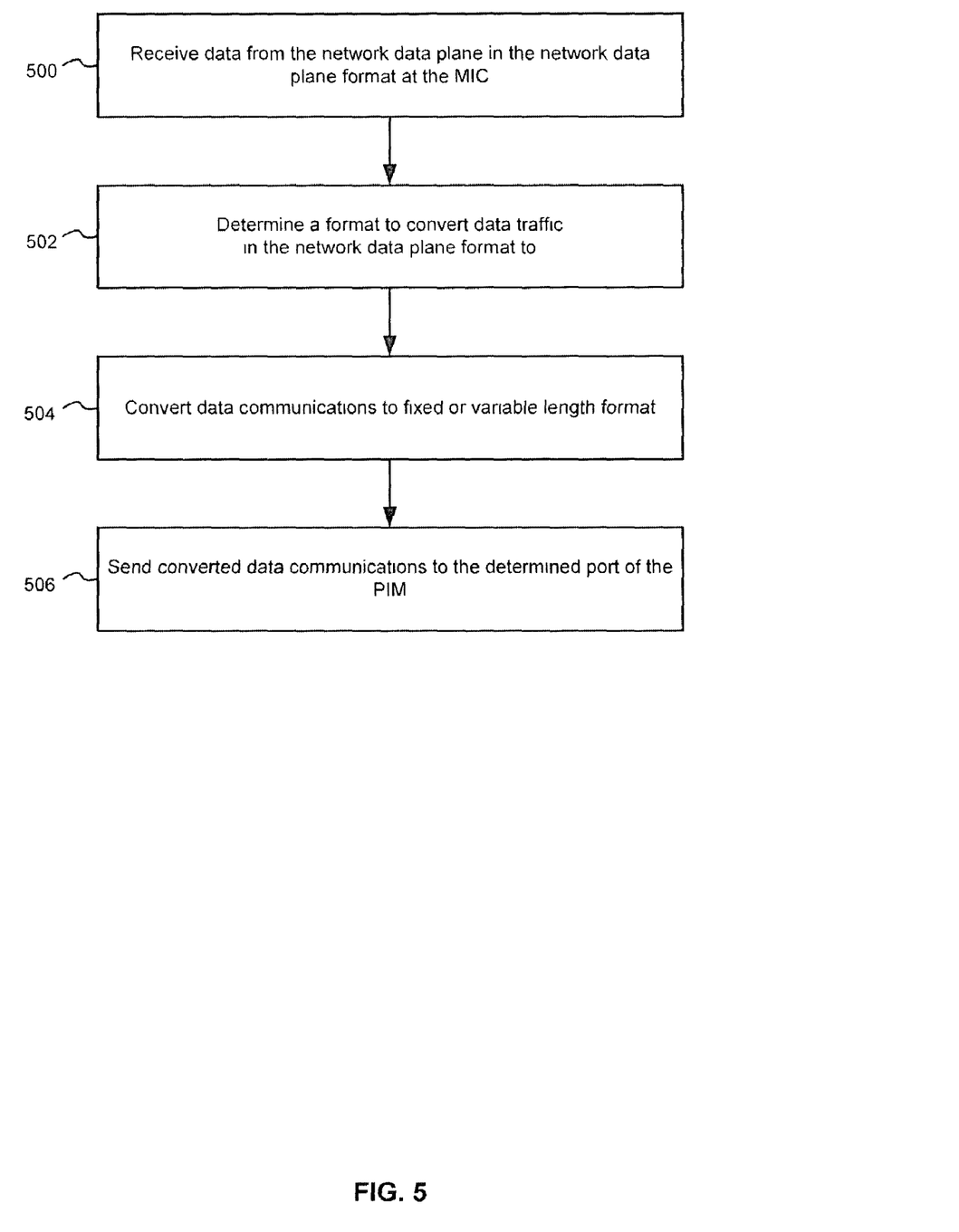
FIG. 5 illustrates a simplified flowchart of a method for transferring and converting data in the egress direction according to one embodiment of the present invention.

FIG. 5 is a simplified flowchart of a method for transferring and converting data in the egress direction according to one embodiment of the present invention. In step 500, data is received from network data plane 108 in a network data plane format at MIC 106. In one embodiment, the data are received at ECM 206.

In step 502, ECM 206 determines whether the data in the network data plane format should be converted to a fixed-length or variable-length format. In one embodiment, ECM 206 reads information found in the data cell to determine the port the data will be sent. Once the port is known, the format in which the port transfers data can be determined. In another embodiment, information found in the cell of data may be used to determine the format in which the data should be converted.

In step 504, ECM 206 converts the fixed or variable length data packet found in the network data plane format into either a fixed or variable length format.

In step 506, the converted data are sent to PIM 104. Once the converted data are received at PIM 104, the data are forwarded to a port in ports 110.

Embodiments of ingress and egress cell data formats will now be described. The cell for each data format is of the same predetermined length. However, the format for the data in the cell may vary depending on whether the cell is for egress or ingress traffic. Additionally, the cell formats may vary depending on whether the data carried is for a variable or fixed length packet. Thus, the ingress and egress cell formats vary depending on whether fixed or variable length data is carried and whether the cell is an ingress or egress cell.

The formats described below are for a cell of data. In an exemplary embodiment, the cell includes sixteen or seventeen words where each word includes 32-bits.

The following data formats may include special characters that are interpreted by network data plane 108. For example, special characters include a cell boundary character, an empty byte character, a frame boundary character, an error frame boundary character, and an idle character.

The cell boundary special character indicates the beginning of the cell of data. Thus, the cell boundary special character is used to determine when a cell starts. The end of a cell of data may also be determined when a cell boundary special character is received. In this case, it is assumed the beginning of the next cell means the end of the prior cell. In one embodiment, the cell boundary special character is represented by a special character S.K28.1.

An empty byte special character is an empty byte and does not include any data information for the data packet. In one embodiment, a word may include four S.K28.2 characters and may be inserted within a cell format. The empty byte may be represented by a special character S.K28.2. The empty byte character is included to avoid the need to buffer packets that have not been completely received. For example, data communications may be received from PIM 104 at data rates slower than the data rates of cells sent to network data plane 108. Thus, in order to maintain the data rate of data communications to network data plane 108, PIM 104 is polled at certain times for data and if no data is present, a word with an empty byte is inserted into the cell of data.

The frame boundary special character indicates the end of data from a variable-length data packet. After an end of frame boundary character, byte locations, if any, following the end of frame character in a word are filled with empty byte characters (e.g., S.K28.2 characters).

The error frame boundary special character indicates an error in the frame boundary. The error frame boundary may be indicated by a special character S.K28.4.

An idle special character allows MIC 106 and network data plane 108 to resolve differences in clock rates. In one embodiment, the idle special character is represented by a special character S.K28.5.

Figure 6:
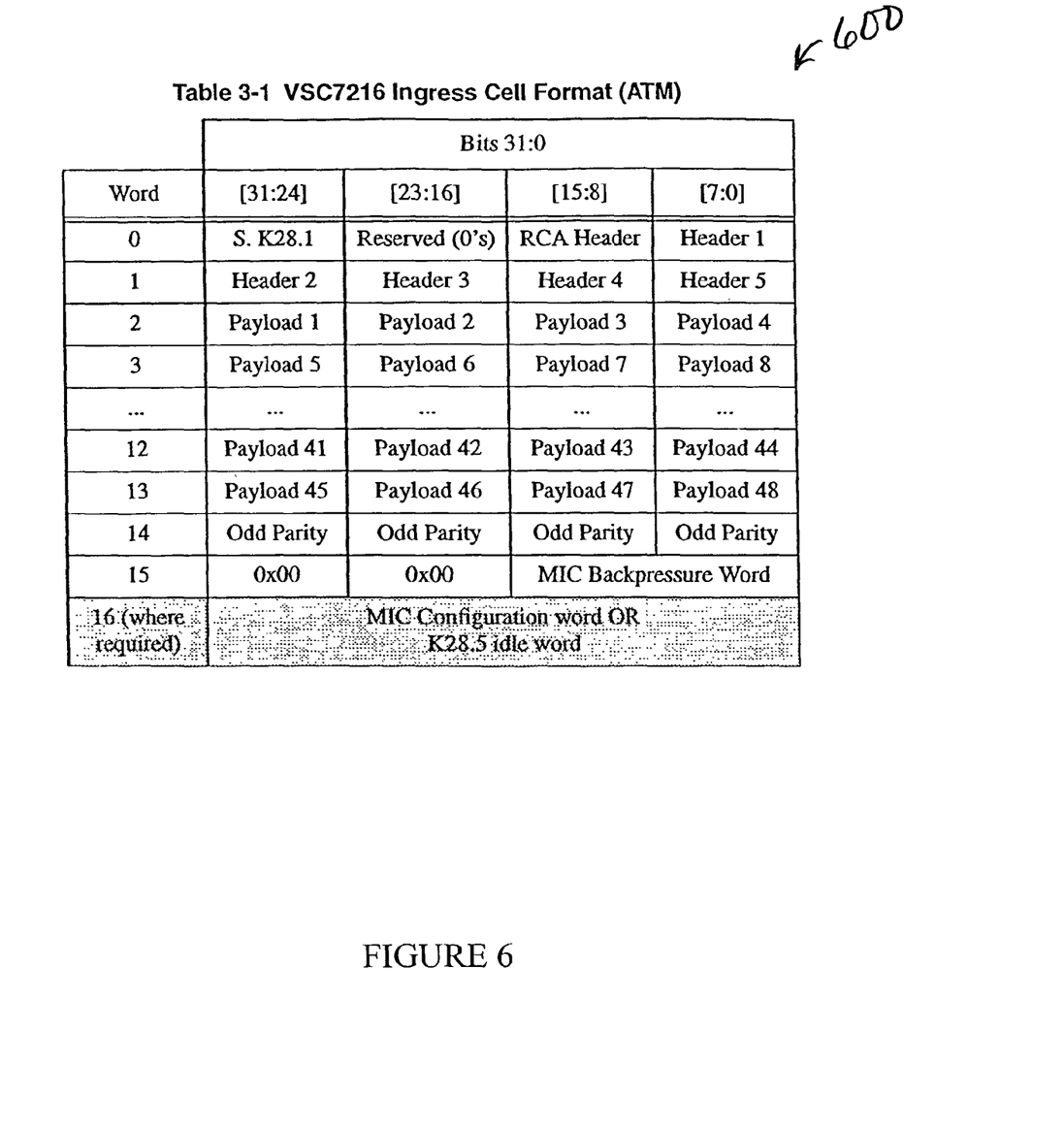
FIG. 6 illustrates an ingress cell data format according to one embodiment.

FIG. 6 illustrates an exemplary ingress cell data format 600 for a cell of data according to one embodiment. In one embodiment, the cell of data includes data of a fixed-length data packet received from ingress data communications. ICM 208 receives the fixed-length packet from PIM 104 and converts it to a data format as shown in FIG. 6.

Ingress cell format 600 includes a first section, a second section, and a third section. In one embodiment, the first section is pre-pended to the second section and the third section is appended to the second section. Also, in one embodiment, the first section is located in, e.g., bits [31:8] of word 0; the second section is located in bits [7:0] of word 0 and bits [31:0] of words 1-13; and the third section is located in bits [31:0] of words 14-16.

In one embodiment, the first section includes a start indication and a port identification for the fixed-length data packet received from PIM 104. A start indication may be a special character, such as an S.K28.1 character, that is located in, e.g., bits [31:24] of word 0. The start indication indicates to network data plane 108 that a cell of data is being sent.

Additionally, in one embodiment, the port identification is located in a rear card assembly (RCA) header. The port identification is used to determine the source port that data in which the data was received. When data is multiplexed into a single stream that is sent to network data processor 108, an identification is needed to determine the port in which the data was received. The RCA header may be found in, e.g., bits [15:8] of word 0. Additionally, the RCA header may include a parity bit, start-of-sequence flag, and an enable bit.

Parity is computed for the RCA header (e.g., the bits corresponding to the start-of-sequence flag, the enable bit, and the port ID bits) and the result of the parity computation is stored in the parity bit in the RCA header. Also, in one embodiment, odd parity is always computed; however, it will be understood that even parity may also be computed.

The start-of-sequence flag is used to indicate that a current cell is associated with a beginning of a sequence of ports. In one embodiment, data communications are process from ports in a set sequence, such as ports 0, 8, 4, 12, 1, 9, 5, 13, 2, 10, 6, 14, 3, 11, 7, and 15. Thus, the start of sequence may indicate that the cell is associated with port0 of PIM 104.

The enable bit is used to represent whether the cell includes valid or invalid data. A valid cell is when the data packet received from PIM 104 is from an active port and contains valid data. An invalid cell is a when the corresponding port does not have an valid data. In one example, the enable bit includes valid data when it is set to one and invalid data when it is set to zero.

Ingress data format 600 also includes zeros in bits [23:16]. These bits may be used for any purpose.

The second section includes data from the data packet received from PIM 104 and is represented as header 1 . . . header 5 and payload 1 . . . payload 48 in FIG. 6. In one embodiment, the fixed-length data packet received at MIC 106 from PIM 104 is in an ATM format.

The third section is appended to the second section. In one embodiment, the third section includes data usable for a parity check of data found in the second section. MIC 106 computes the parity of the data in the first and second sections and stores the parity results in the cell. In one embodiment, the parity check results are located in, e.g., word 14 in bits [31:0]. As shown, the parity check is an odd parity check; however, it will be understood that an even or odd parity check may be used. The parity check that is used is determined from the parity bit found in the first section. For example, word 14, bit[31] contains parity check computed over bit[31] of word 0 up to word 13.

The third section also includes a MIC backpressure word. In one embodiment, the MIC backpressure word is located in, e.g., word 15 in bits [15:8] and [7:0]. The MIC backpressure word is used as a feedback mechanism to control data communications rates from network data plane 108 and indicates to network data plane 108 whether it should stop sending data cells to MIC 106 for a particular port 110. In one embodiment, the backpressure word is 16-bits, one bit for each port. Thus, the backpressure word is used as a control signal for the data rate of egress data communications.

Ingress cell format 600 also includes zeros in bits [31:24] and [23:16] in word 15. These bits may be used for any purpose.

In one embodiment, word 16 in ingress cell format 600 includes a MIC configuration word or an idle character word, such as a S.K28.5 special character. The MIC configuration word includes a configuration of MIC 106. For example, the configuration word may indicate whether the source port from which the data was received is of a fixed-length or variable-length format. Also, the configuration word may be used to indicate other characteristics of the source port, such as the speed of the port. When the configuration word is not used, the idle byte may be included in word 16. In one embodiment, the configuration word may be sent at intervals, such as every three cells. Thus, when the configuration word is not sent, four idle bytes are sent in word 16.

Figure 7:
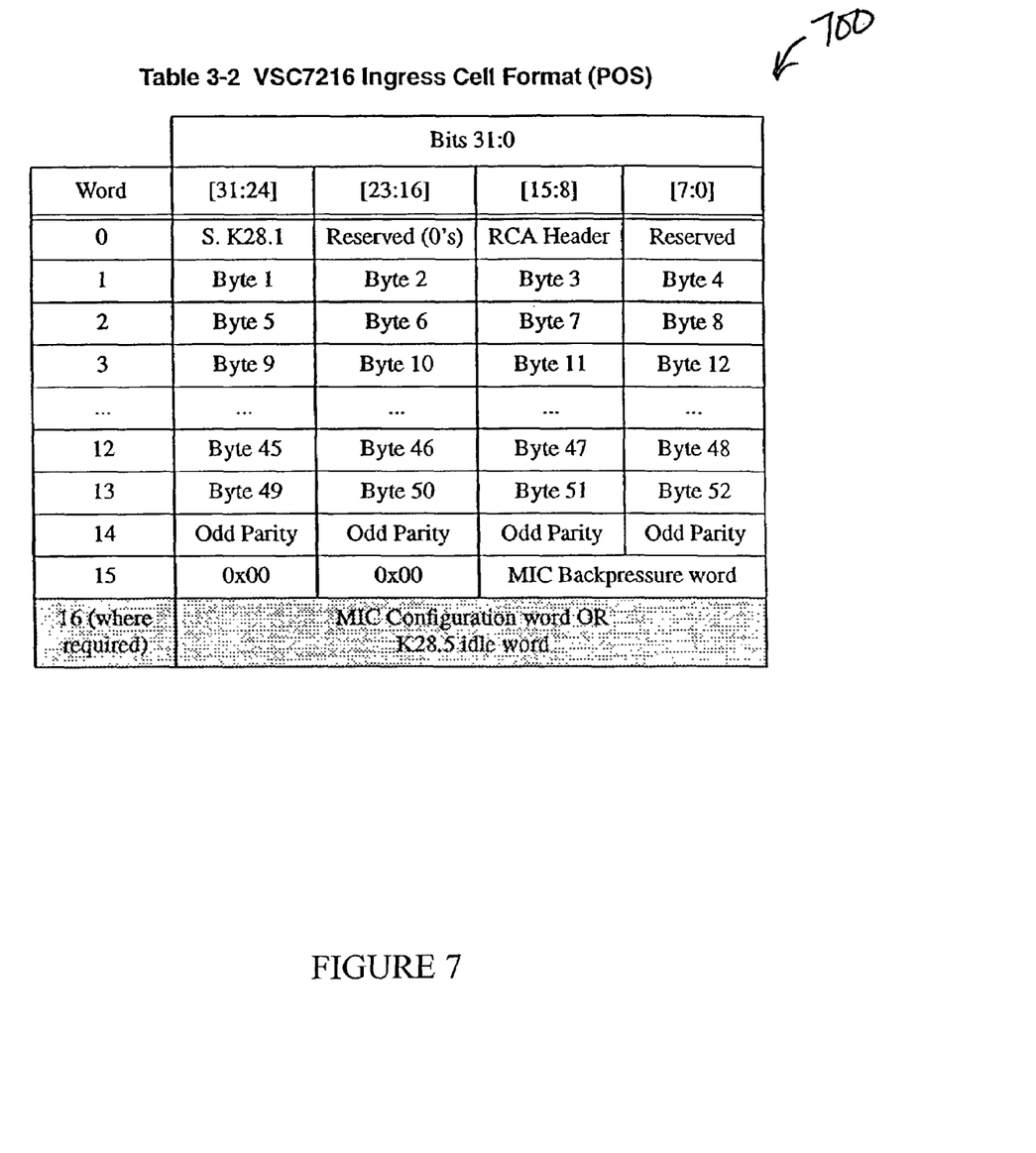
FIG. 7 illustrates another embodiment of an ingress cell format.

FIG. 7 illustrates an exemplary ingress cell format 700 for a variable-length packet according to one embodiment. In this embodiment, the ingress data received from PIM 104 are of a variable-length. Ingress cell format 700 includes a first section, a second section, and a third section. The first section is prepended to the second section and the third section is appended to the second section.

The first section includes a start indication and port identification as described above with respect to ingress cell format 600. In one embodiment, the first section also includes a parity, start-of-sequence flag and enable bit, as described above.

Also, in one embodiment, a reserved byte is located in word 0 in bits [7:0]. The byte may be used for any purpose.

The second section includes a portion of or the entirety of a variable-length packet received from PIM 104. As shown in FIG. 7, the second section also includes bytes 1-52 in words 1-13. A byte X in bytes 1-52 in ingress cell format 700 may include ingress packet data or a special character. For example, a special character may include an empty byte character, a frame boundary character, an error frame boundary character, as described above.

A third section includes a parity check and MIC backpressure word as described above with respect to ingress cell format 600. Additionally, a MIC configuration word or idle word may be included as described above with respect to ingress cell format 600.

Ingress cell format 700 also includes zeros in bits [31:24] and [23:16] in word 15. These bits may be used for any purpose.

Figure 8:
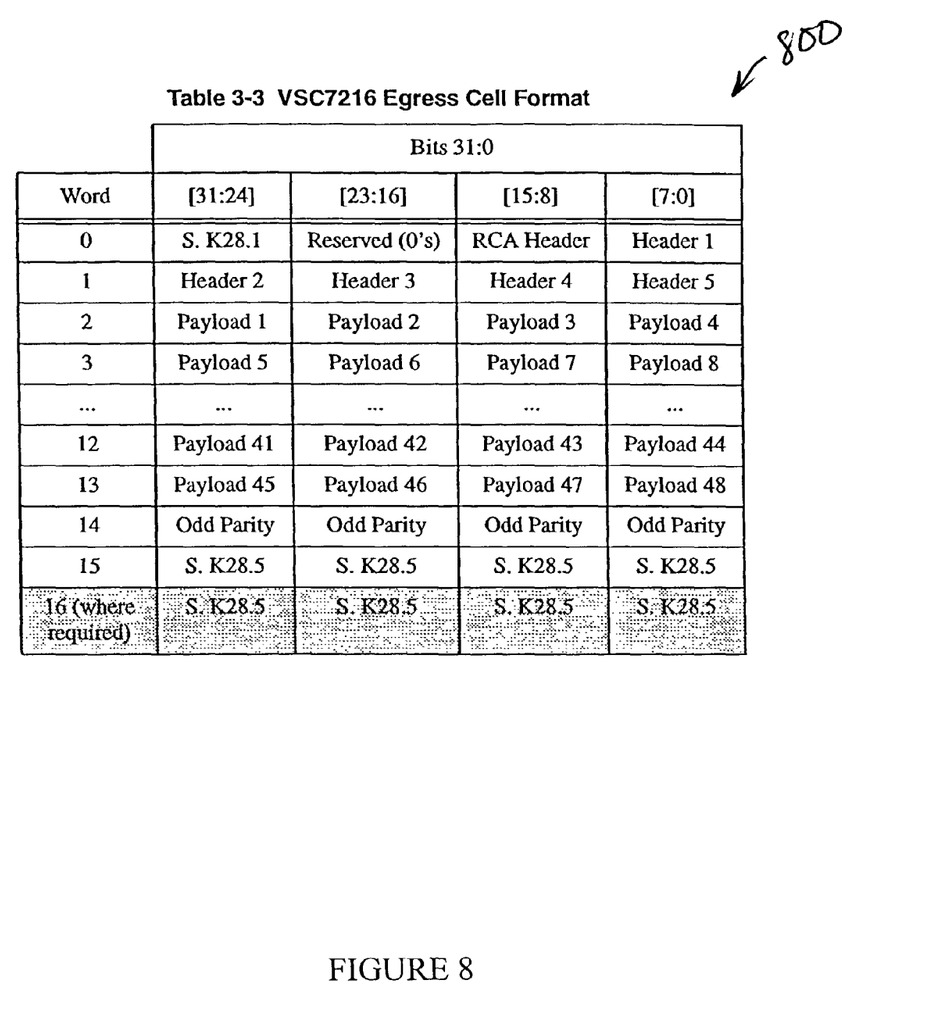
FIG. 8 illustrates an egress cell format according to one embodiment of the present invention.

FIG. 8 illustrates an exemplary egress cell format 800 according to one embodiment of the present invention. Egress cell format 800 is in the predetermined fixed-length network data plane format as readable by network data plane 108. In the embodiment, egress cell format 800 includes a first section, a second section, and a third section.

The first section includes a start character and a port indication. The start character indicates the start of the cell and a special character S.K28.1 may be used. The port indication indicates a port in PIM 104 where the data found in the egress cell format 800 should be sent. The indicated port is a port in PIM 102. More specifically, ports P0 . . . P7 in PIM 202 and ports P8 . . . P15 in PIM 204 may be specified.

In one embodiment, the first section also includes a parity, and enable bit, as described above. Egress data format 800 also includes zeros in bits [23:16]. These bits may be used for any purpose.

The second section includes a fixed-length packet of data located in word 0, bits [7:0] and words 1-13, bits [31:0]. As shown, a header 1-5 is included with 48 bytes of payload data. The second section is in a fixed-length format, such as an ATM cell format.

The third section includes a parity check. In one embodiment, the parity check may be found in bits [31:0] of word 14. Additionally, special characters may be included in words 15 and 16. In one embodiment, the special characters K28.5 are idle words.

Figure 9:
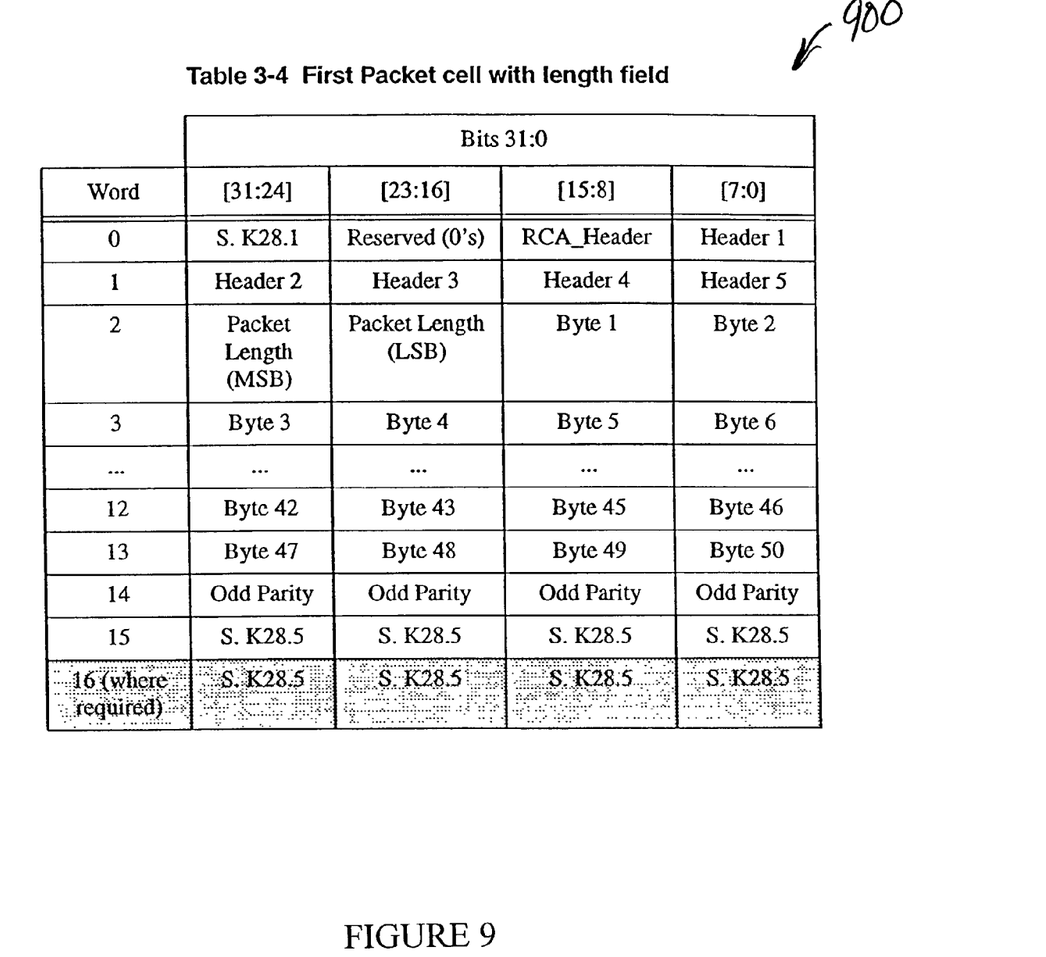
FIG. 9 illustrates another embodiment of an egress cell format.

FIG. 9 illustrates an egress cell format 900 according to one embodiment of the present invention. Egress cell format 900 includes a first section, a second section, and a third section.

The first section includes a start indication and port identification. In one embodiment, a start indication may be a special character, such as an S.K28.1 character, that is located in bits [31:24] of word 0. The start indication indicates to MIC 106 that a cell of data is being sent.

Additionally, in one embodiment, the port identification is located in an RCA header. The port identification is used to determine a port in which data found in egress cell format 900 will be sent. In one embodiment, the first section also includes a parity, and enable bit as described above.

Egress data format 900 also includes zeros in bits [23:16]. These bits may be used for any purpose.

The second section includes fifty bytes of data located in word 0, bits [7:0] and words 1-13, bits [31:0]. The bytes of data are for a variable-length data packet. A header 1 . . . header 5 is located in bits [7:0] of word 0 and bits [31:0] of word 1.

The second section also includes a packet length indicator. In one embodiment, the packet length is located in, e.g., the most significant bit and least significant bit in bits [31:24] and [23:16] of word 2. The packet length indicates the length of the variable-length data packet. The purpose of including the length of the packet is because a cell can include data that varies in length. Thus, MIC 106 will know how large the packet data is from the packet length indicator.

The third section includes a parity check. In one embodiment, the parity check may be found in bits [31:0] of word 14. Additionally, special characters may be included in words 15 and 16. In one embodiment, the special characters are S.K28.5 idle words.

Accordingly, embodiments of the present invention provide egress and ingress cell data formats, which are in a predetermined network data plane format. In the ingress direction, data from data packets in the form of variable-length and fixed length formats are converted into one of the ingress cell data formats. In the egress direction, data found in the network data plane format is converted in fixed-length and variable-length data formats.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for converting data in a telecommunications system, the method comprising:
   receiving data in a plurality of data formats through an interface module, wherein the plurality of data formats includes a variable format of a variable-length and a fixed format of a fixed-length;
   converting the data in the plurality of data formats to a predetermined network data plane format, the predetermined network data plane format being different from said plurality of data formats;
   polling the interface module to determine if additional data is available;
   inserting empty byte characters into the converted data to maintain a data rate of the network data plane format if it is determined that additional data is not available;
   sending the data in the network data plane format to a network data plane at the rate of the network data plane format;
   receiving data in the predetermined network data plane format from the network data plane;
   determining a format from the plurality of data formats into which the data received from the network data plane is converted;
   converting the data in the network data plane data format to the determined data format; and
   sending the data in the determined data format to the interface module.

2. The method of claim 1, wherein converting the data to the predetermined network data plane format comprises adding a header section to the data, the header section including a start indication and a header indication for the data.

3. The method of claim 2, wherein the header indication comprises at least one of a parity bit, start of sequence flag, enable bit, and port identification for the data.

4. The method of claim 2, wherein the header indication is located in bits [15:8] of a zero 32-bit word of the network data plane format.

5. The method of claim 2, wherein the start indication is located in bits [31:24] of a zero 32-bit word of the network data plane format.

6. The method of claim 1, wherein converting the data to the predetermined network data plane format comprises adding an ending section, the ending section comprising a parity check indication and backpressure indication.

7. The method of claim 6, wherein the ending section is located in bits [31:0] of a fourteenth 32-bit word, a fifteenth 32-bit word, and sixteenth 32-bit word of the network data plane format.

8. The method of claim 6, wherein the parity indication is located in bits [31:0] of the fourteen 32-bit word of the network data plane format.

9. The method of claim 6, wherein the backpressure indication is located in bits [15:0] of the fifteenth 32-bit word of the network data plane format.

10. The method of claim 6, wherein the ending section includes a configuration word, the configuration word located in bits [31:0] of the sixteenth 32-bit word of the network data plane format.

11. The method of claim 6, wherein the ending section includes one or more IDLE special characters, the one or more IDLE special characters located in bits [31:0] of the sixteenth 32-bit word of the network data plane format.

12. The method of claim 1, wherein converting the data to the predetermined network data plane format comprises adding a middle section, the middle section including the data received from the interface module.

13. The method of claim 12, wherein the middle section is located in bits [7:0] of a first word and bits [31:0] of first through thirteenth 32-bit words in the network data plane format.

14. The method of claim 1, wherein converting the data in the network data plane data format to the determined data format comprises extracting data found in a middle section of the data received in the network data plane format.

15. The method of claim 1, further comprising using information contained in the network data format to control an egress rate of the determined data format.

16. An ingress data formatter for converting data received from an interface system into cells of data in an ingress data format of a network data plane, the received data received in a plurality of formats including a fixed-length data format and a variable-length data format, wherein each cell of data includes data for one of the plurality of data formats, the ingress data formatter comprising:

means for providing a header section of the ingress data format including a start indication and a port identification for the data, wherein the start indication indicates a start of a cell of data and the port indication indicates a port from which the data was received;

means for providing a middle section of the ingress data format appended to the header section, the middle section including data received from the interface system in one of the plurality of data formats; and     means for providing an ending section of the ingress data format appended to the middle section, wherein the ending section includes a parity check indication and backpressure indication, wherein the parity check indication is used for error checking the data in the cell of data and the backpressure indication indicates a control signal for a processor receiving the cell of data,     wherein the header section, middle section, and ending section of the ingress data format for the cell of data have a same length for data received in the fixed-length data format and variable-length data format.

17. The ingress data formatter of claim 16, wherein the header section further comprises at least one of a parity bit, a start of sequence flag, and an enable bit.

18. The ingress data formatter of claim 16, wherein the header section is located in bits [31:7] of a zero 32-bit word of the cell of data.

19. The ingress data formatter of claim 16, wherein the start indication is located in bits [31:24] of a zero 32-bit word of the cell of data.

20. The ingress data formatter of claim 16, wherein the port identification is located in bits [11:8] of a zero 32-bit word of the cell of data.

21. The ingress data formatter of claim 16, wherein the middle section is located in bits [7:0] of a zero 32-bit word and bits [31:0] of a first through thirteenth words of the cell of data if the data in the middle section is of a fixed-length format.

22. The ingress data formatter of claim 16, wherein the middle section is located in bits [31:0] of first through thirteenth words of the cell of data if the data in the middle section is of a variable-length format.

23. The ingress data formatter of claim 16, wherein the ending section is located in bits [31:0] of a fourteenth word, a fifteenth word, and a sixteenth word of the cell of data.

24. The ingress data formatter of claim 23, wherein the backpressure indication is located in bits [15:0] of a fifteenth word of the cell of data.

25. The data format of claim 23, wherein the ending section comprises a configuration indication located in bits [31:0] of the sixteen word of the cell of data.

26. The method of claim 23, wherein the ending section includes one or more IDLE special characters, the one or more IDLE special characters located in bits [31:0] of the sixteenth 32-bit word of the cell of data.

27. An egress data formatter for converting cells data in an egress data format of a network data plane into data packets of a plurality of data formats, the plurality of data formats including a fixed-length data format and a variable-length data format, wherein each cell of data includes data for one of the plurality of data formats, the egress data formatter comprising:

means for processing a header section of the egress data format including a start indication and a port identification for the data, wherein the start indication indicates the start of a cell of data and the port indication indicates a port identification where the data should be sent;

means for processing a middle section of the egress data format appended to the header section, the middle section including the data in the cell of data to be converted into a data packet of one of the plurality of data formats, wherein the middle section contains a packet length indicator if variable-length is included in the cell of data; and     means for processing an ending section of the egress data format appended to the middle section, wherein the ending section includes a parity check indication, wherein the parity check indication is used for error checking the data in the cell of data,     wherein the header section, middle section, and ending section of the egress data format for the cell of data are a same length for the data that will be converted into the fixed-length data format and variable-length data format.

28. The egress data formatter of claim 27, wherein the header section further comprises a header section that includes at least one of a parity bit and an enable bit.

29. The egress data formatter of claim 28, wherein the port identification and header section are located in bits [11:8] of a zero 32-bit word of the cell of data.

30. The egress data formatter of claim 27, wherein the header section is located in bits [31:7] of a zero 32-bit word of the cell of data.

31. The egress data formatter of claim 27, wherein the start indication is located in bits [31:24] of a zero 32-bit word of the cell of data.

32. The egress data formatter of claim 27, wherein the middle section is located in bits [7:0] of a zero 32-bit word and bits [31:0] of first through thirteenth 32-bit words of the cell of data.

33. The egress data formatter of claim 27, wherein the packet length indicator is located in bits [31:16] of second 32-bit word of the cell of data.

34. The egress data formatter of claim 27, wherein the ending section is located in bits [31:0] of a fourteenth 32-bit word, a fifteenth 32-bit word, and sixteenth 32-bit word of the cell of data.

35. The egress data formatter of claim 27, wherein the parity check indication is located in bits [31:0] of a fourteenth word of the cell of data.

36. The egress data formatter of claim 27, wherein the ending section comprises one or more IDLE special characters in a fifteenth and sixteenth 32-bit words of the cell of data.

37. An interface for coupling an interface module and a network data plane in a telecommunications system, the interface comprising:

an ingress module configured to receive data packets of a plurality of data formats through the interface module, wherein the plurality of data formats includes a variable format of a variable-length and a fixed format of a fixed-length, wherein the ingress module is configured to convert the data packets of the plurality of data formats to a network data plane format different from said plurality of data formats and send the data in the network data plane format to the network data planes, wherein the ingress module is further configured to poll the interface module for additional data and, based upon the availability of additional data at the interface module, the ingress module inserts empty byte characters into the converted data to maintain a rate of the data in the network data plane format; and an egress module configured to receive data communications in the network data plane format from the network data plane and convert the data communications in the network data plane format to a data format in the plurality of data formats, wherein the data format may be the variable data format of the variable-length or the fixed format of the fixed-length, wherein the egress module is configured to send the data communications in the data format in the plurality of formats to the interface module.

38. The interface of claim 37, wherein the egress module is configured to use information contained in the network data plane format to control an egress rate of the data communications sent to the interface module.

* * * * *